United States Patent
Arellanes et al.

(10) Patent No.: US 7,451,142 B2
(45) Date of Patent: Nov. 11, 2008

(54) AUTONOMIC RELEVANCY BUILDING

(75) Inventors: Paul Thomas Arellanes, Austin, TX (US); Mary Catherine Burton, Springfield, IL (US); Elizabeth A. Halliday-Reynolds, Austin, TX (US); William S. Liu, Cupertino, CA (US); Jason Thomas Read, Provo, UT (US); Douglas Dwaine Yakesch, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 11/207,075

(22) Filed: Aug. 18, 2005

(65) Prior Publication Data

US 2007/0043718 A1 Feb. 22, 2007

(51) Int. Cl.
*G06F 17/30* (2006.01)
(52) U.S. Cl. .............................. 707/5; 707/102; 707/103
(58) Field of Classification Search .................. 707/5, 707/102, 103
See application file for complete search history.

(56) References Cited

U.S. PATENT DOCUMENTS

| | | | | |
|---|---|---|---|---|
| 6,957,186 | B1 * | 10/2005 | Guheen et al. ............... | 705/1 |
| 2003/0115191 | A1 * | 6/2003 | Copperman et al. .......... | 707/3 |
| 2006/0253550 | A1 * | 11/2006 | Eisenberger et al. ......... | 709/217 |

OTHER PUBLICATIONS

Pierce, Optimizing your documentation with the help of technical support, IBM Rational Software, Oct. 12-15, 2003, 5 pages.*
Goeller Zen and the art of learning support combining documenttation, training, and online help functions for a unique organization approach to information development, Bellcore, 1994, 15 pages.*

* cited by examiner

*Primary Examiner*—John Cottingham
*Assistant Examiner*—Noosha Arjomandi
(74) *Attorney, Agent, or Firm*—Duke W. Yee; Cas K. Salys; Wayne P. Bailey

(57) ABSTRACT

A method and system for autonomic relevancy building using information obtained from clients to improve customer support. Upon receiving a client request for product support information, product support information objects representing the requested product support information in an information library are identified. Relevant product support information corresponding to the identified relevant product support information objects are provided to the client. Data regarding whether or not the information provided to the client is relevant may be obtained from the client through implicit feedback (such as, system usage), explicit feedback (such as, user feedback), metadata information, or any combination thereof. Relevancy associations may be created between the product support information objects based on the relevancy data. Relevancy weights may also be assigned to each relevancy association based on the relevancy data, wherein the relevancy weights designate a certainty of each relevancy association.

20 Claims, 9 Drawing Sheets

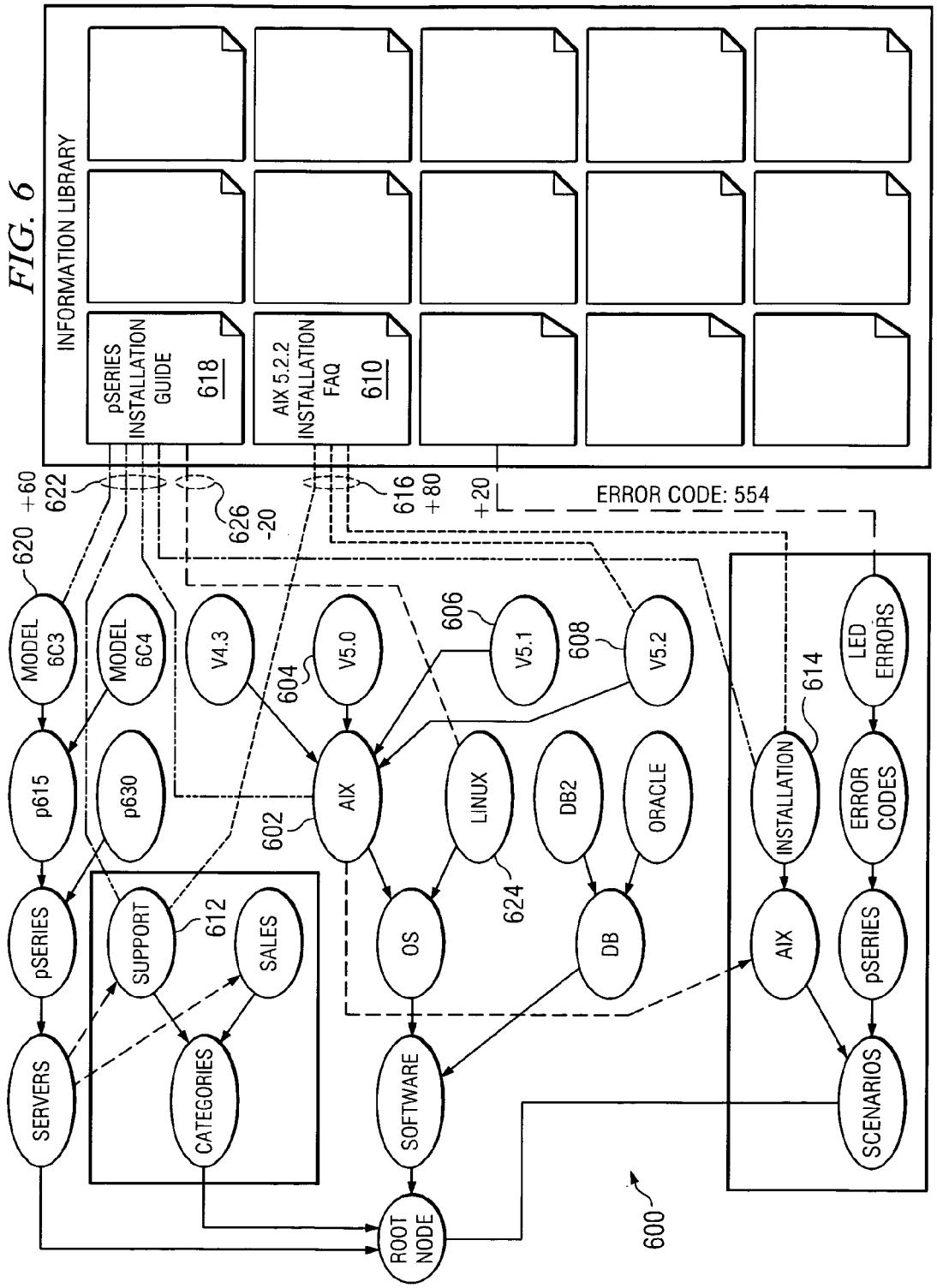

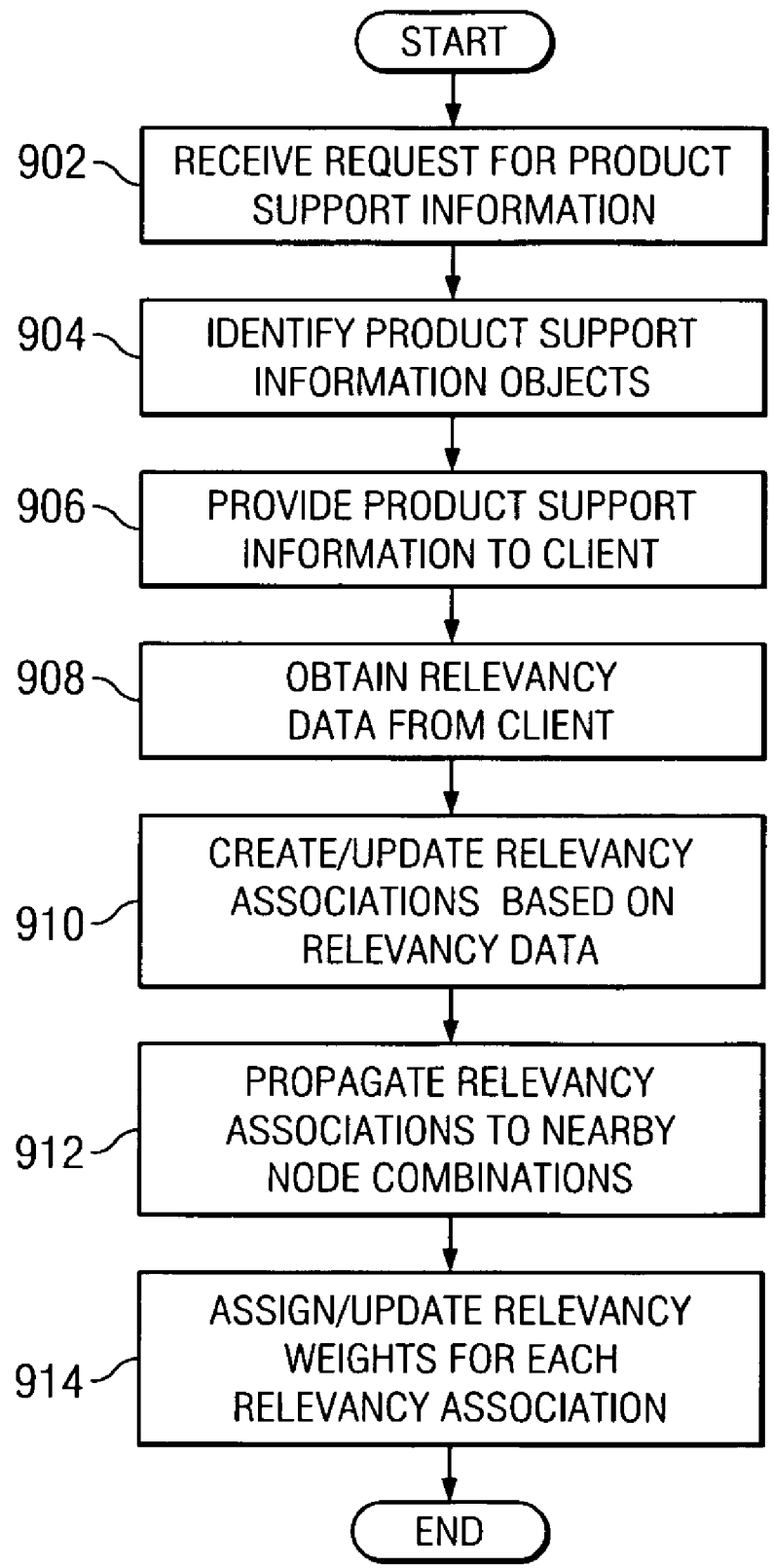

AUTONOMIC RELEVANCY BUILDING

BACKGROUND OF THE INVENTION

1. Technical Field

The present invention relates to an improved data processing system, and in particular, to a data processing system for providing support for computer products. More specifically, the present invention is directed to a system and method for organizing and personalizing the product support experience for clients.

2. Description of Related Art

The Internet has become a cultural fixture as a source of both information and entertainment. In addition to simply operating as a source of information, the Internet often provides business enterprises with the ability to interact electronically with their customers and provide a number of value added services. For example, various Internet-based technologies have been developed to enhance the product support services provided by businesses to their customers.

Conventional Internet-based product support technologies have focused primarily on providing on-line access to product support information for troubleshooting purposes, as well as providing on-line access to downloadable software patches, service packs, drivers, updates and the like, subsequent to the release of a computer-related product. In the former instance, users are often permitted to search knowledge bases to locate information about particular problems experienced by customers, as well as search for potential solutions, workarounds, etc. In the latter instance, users may either be required to periodically check a manufacturer's website for new updates, or in the alternative, a manufacturer may find an update sufficiently important to warrant notifying customers of the presence of new updates via email or regular mail.

While conventional methods of online product support often provide some degree of assistance to customers, in many instances, product support information that could be helpful to clients may be available only internally to the business enterprise itself. Consequently, a business enterprise may have a significant amount of information that is not being used to its full potential. In addition, as clients purchase solutions from a business and then later seek information to troubleshoot a problem, the clients want information at the solution level, not at the product level. Furthermore, product support information that is available to clients may be spread across different sources and repositories. As a result, clients may be required to search knowledge bases and access multiple product sites of an enterprise in order to locate particular product or solution information. These processes can be excessively burdensome since the information, even if available to the client, may be difficult for the client to locate. This burden is compounded if there is no uniformity in presentation across the multiple product sites. For example, different products offered by a business enterprise may have a different look and feel from one another if the products are developed by different development teams. Thus, existing product support methods do not provide all of the available resources that a client may need to resolve a technical problem at a solution level.

Furthermore, information about the clients themselves is not being used to personalize and improve the product support experience. Consequently, existing clients are working too hard to support solutions provided by business enterprises. This lack of personalization may result in decreased customer satisfaction, poor perception of customer experience, and may necessitate a high level of interaction between clients and the business' support services as well.

Therefore, it would be advantageous to have a method and system for providing product support information in an organized manner so clients may quickly and easily obtain access to relevant information for a solution. It would further be advantageous to maintain the organization of product support information based on user input, such as system usage and feedback. It would further be advantageous to utilize information about a business' clients to personalize the product support experience.

SUMMARY OF THE INVENTION

The aspects of the present invention provide the ability to maintain the organization of product support information based on system usage and feedback. The present invention provides a process for autonomic relevancy building that uses information obtained from clients to improve customer support. When a request for product support information is received from a client, relevant product support information objects representing the requested product support information in an information library are identified. The relevant product support information corresponding to the identified relevant product support information objects are provided to the client. Data regarding whether or not the information provided to the client is relevant may be obtained from the client through implicit feedback (such as, system usage), explicit feedback (such as, user feedback), metadata information, or any combination thereof. Relevancy associations may be created between the product support information objects based on the relevancy data. Relevancy weights may also be assigned to each relevancy association based on the relevancy data, wherein the relevancy weights designate a certainty of each relevancy association.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is an exemplary diagram of the relevancy association architecture in accordance with illustrative embodiments of the present invention;

FIG. 9 is a flowchart of a process for autonomic relevancy building in accordance with illustrative embodiments of the present invention.

DETAILED DESCRIPTION OF THE PREFERRED EMBODIMENT

Figure 1:
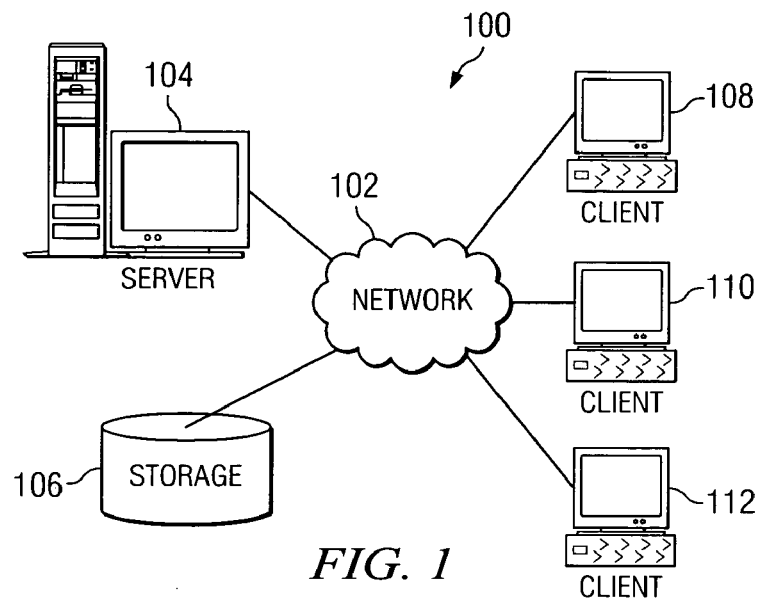
FIG. 1 is a diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
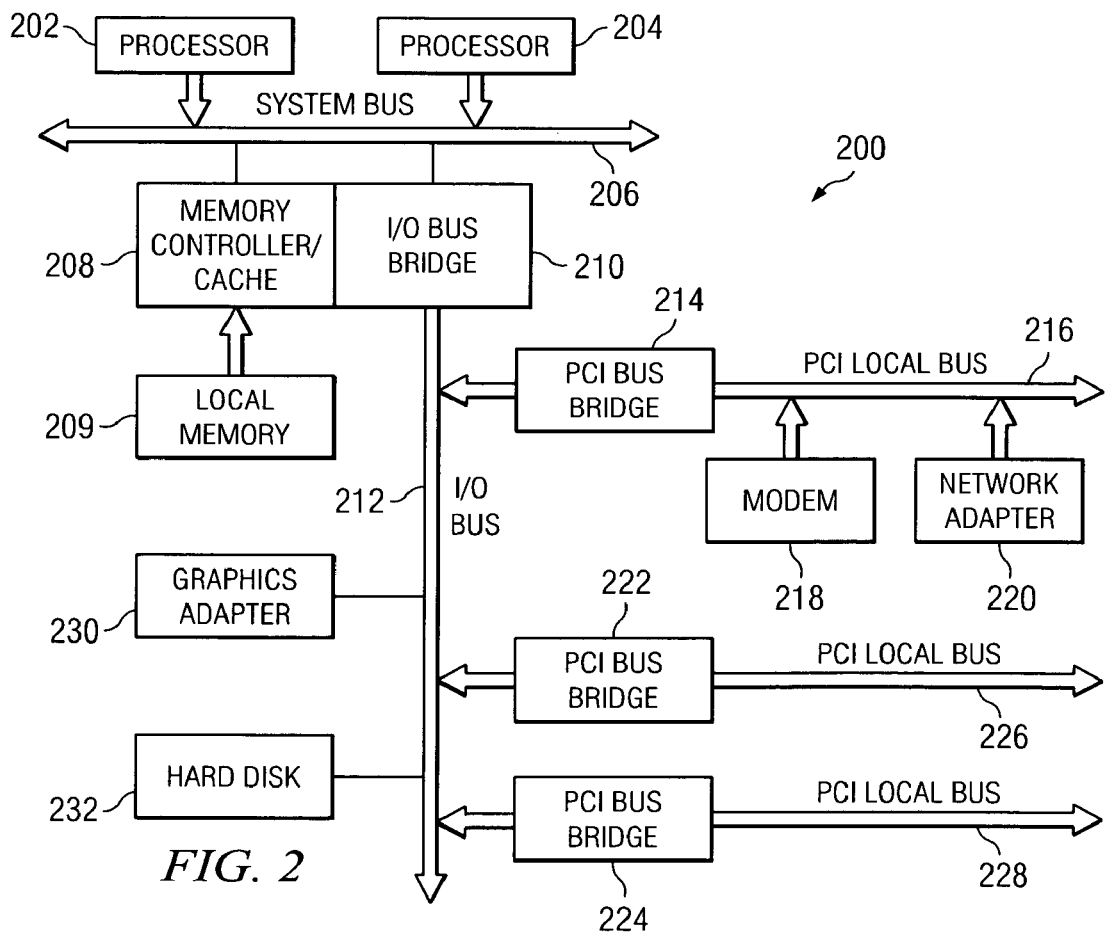
FIG. 2 is a block diagram of a server computing device in which illustrative embodiments of the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
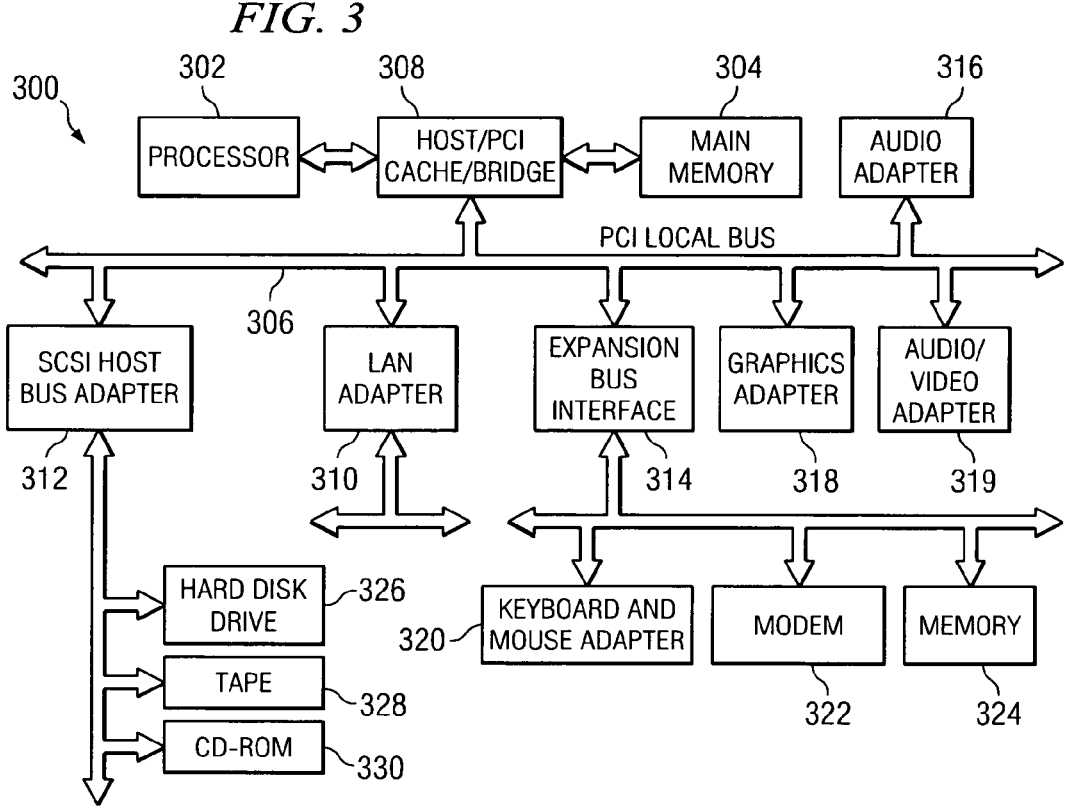
FIG. 3 is a block diagram of a client computing device in accordance with illustrative embodiments of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The aspects of present invention provides a mechanism for improving customer support by collecting helpful product support information from internal sources (including those currently inaccessible to clients) and providing information to clients that address their information needs at the solution level. With the present invention, product support information is organized in a manner that allows clients to obtain access, via Web self-service, to relevant information quickly and easily. By providing relevant information to meet clients' needs, non-defect related client phone calls to support centers may subsequently be reduced. The aspects of the present invention improve upon existing support systems by increasing the ease at which clients find answers to technical problems, as well as increasing the ability for clients to achieve their goals by providing relevant information on demand and, eventually, autonomically.

In particular, the different aspects of present invention provide a relevancy association architecture that allows for organizing available product support information in a business enterprise. The relevancy association architecture is component-based and open to enable other players to use the relevancy engine of the present invention. Relevant product support information is provided to clients based on associations that link the business enterprise's available products within the relevancy association architecture. Associations within the relevancy association architecture are created based on a context-scenario information organization model, which provides a framework of possible contexts and scenarios for information space.

For example, context is used to determine the setting or circumstances wherein information is needed. Scenarios are used to determine which events have occurred within the contexts that have caused a need for information. Relevancy associations are represented through an ontology, wherein products of the business are linked together and relevancy associations are created through linkage sets from information objects in an information library. A linkage set is the association of an information object in an information library to the product nodes in the ontology. Organizing a business' product support system in this manner allows clients, who are searching for product or solution information on the business' Web site, to obtain access to relevant information and improve the customer support experience. Linkage sets are assigned weights to designate the certainty of the relevancy association.

In addition to providing a relevancy association architecture, the present invention also uses the architecture to allow for autonomic relevancy building in a context-scenario organization model. Autonomic relevancy building is a process through which relevancy of information objects are identified and improved based on user input, such as, for example, system usage and feedback. System usage can be based on information object impressions and usage. For example, if a user enters search criteria and receives a list of results, the objects the user selects to view will have a greater relevance than the other unselected pages based on the user's usage. In a similar manner, the longer the user spends viewing a page, the more relevant the link becomes based on the usage.

User comments, regarding whether information in a link was helpful or not, are used to create feedback-based relevancy associations. The feedback received from the users may be positive, negative, or neutral responses. Since the feedback approach obtains direct input from users as to the relevancy of the information presented, information obtained from feedback is more reliable than information obtained from system usage. As a result, feedback-based relevancy associations may be weighted more than system-based relevancy associations. Thus, information obtained from user feedback may supercede the information obtained from system usage.

Moreover, relevancy associations may be propagated to nearby nodes in the context-scenario organization model (ontology). For example, if information is relevant to a particular node combination, it is most likely also relevant (although to a lesser extent) to similar node combinations. For instance, an AIX 5.2 relevancy association may be propagated to the AIX parent link and its siblings. This propagation is described further in FIG. 6 below.

Figure 4A:
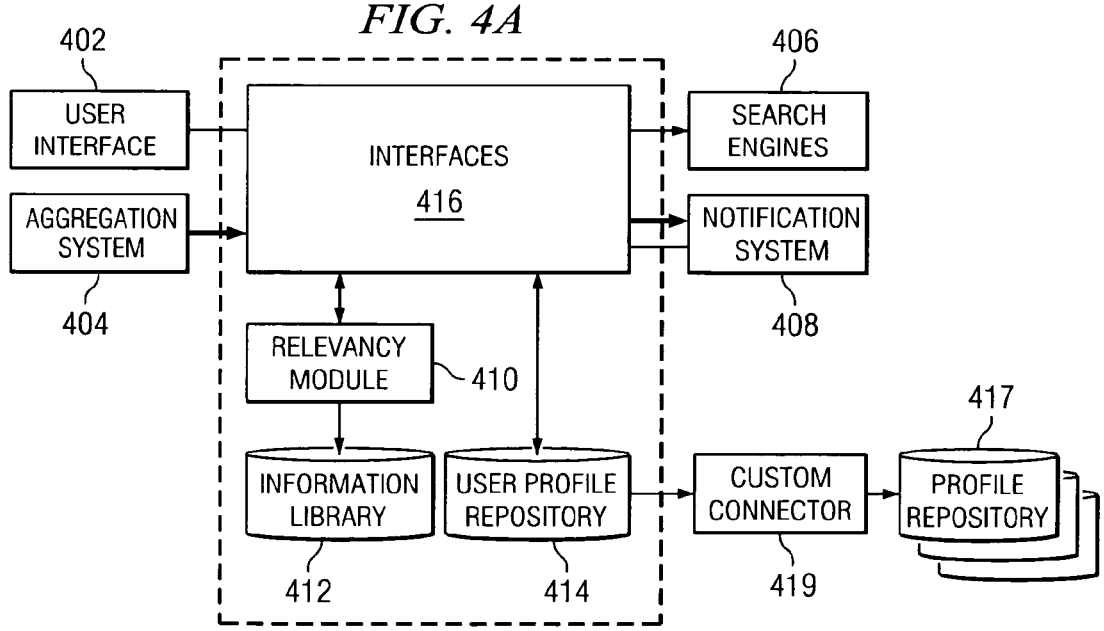
FIGS. 4A-4E are exemplary diagrams of components used for implementing illustrative embodiments of the present invention.

Turning now to FIG. 4A, an exemplary diagram of components used for implementing a preferred embodiment of the present invention is shown. In particular, FIG. 4A illustrates the application of a context-scenario organization and relevancy system, which may be implemented in a data processing system, such as data processing system 200 in FIG. 2.

Context-scenario organization and relevancy system 400 is flexible in that it may be used in any information space where context-scenario organization is optimal. Context-scenario organization and relevancy system 400 is also scalable as it is flexible to meet the demands of changing business environments and information spaces. Context-scenario organization and relevancy system 400 is also modular as the system may be plugged into existing technology environments, including user interaction interfaces, such as user interface 402, data aggregation systems, such as aggregation system 404, search engines, such as search engine 406, and notification delivery methods, such as notification system 408.

In this illustrative example, context-scenario organization and relevancy system 400 comprises relevancy module 410, information library 412, user profile repository 414, and interfaces 416. User profile repository 414 may include profile information from profile repository 417 via custom connector 419. Interfaces 416 may include an information aggregation interface, a search interface, a user interaction interface, and a notification interface. These interfaces are described in FIGS. 4B-4E below.

Figure 4B:
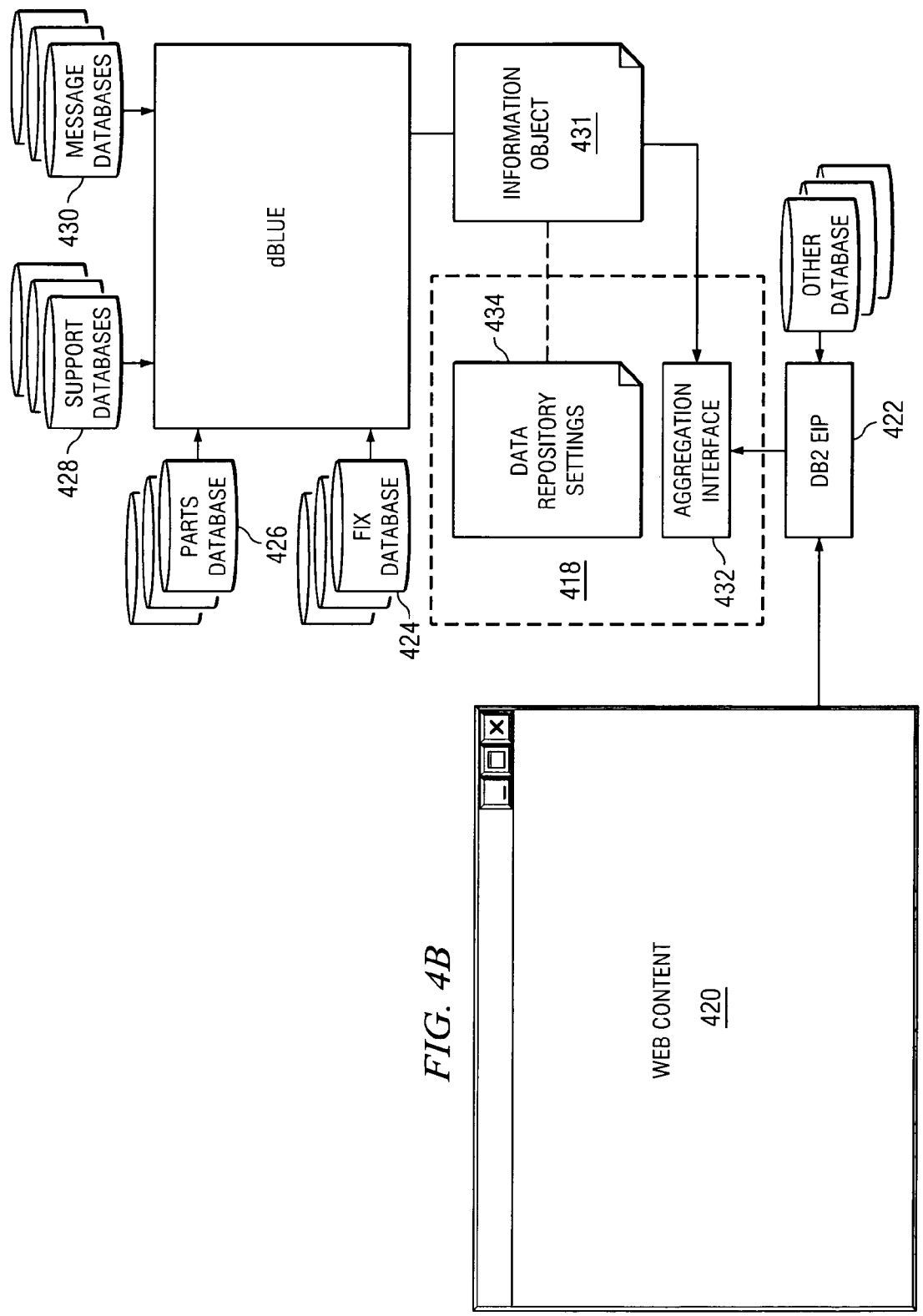

The information aggregation interface provides a standard interface for integration with data aggregation systems, such as aggregation system 418 shown in detail in FIG. 4B. The mechanism of the present invention does not aggregate information itself, but rather allows for the concurrent use of any number of aggregation systems through the information aggregation interface. In FIG. 4B, information in an existing database for aggregated Web content such as Web content database 420 may be provided to the information aggregation interface via a DB2 EIP information integrator 422. Likewise, information in other databases, such as fix database 424, parts database 426, support database 428, or message database 430 for example, may be provided as information object 431 to information aggregation interface 432. Each information object may belong to a unique data repository. Each data repository has settings 434 that define relevancy rules and information object properties. These data repository settings, such as file type, object expiration, role, security, etc., may be used to establish initial relevancy and information object metadata.

Figure 4C:
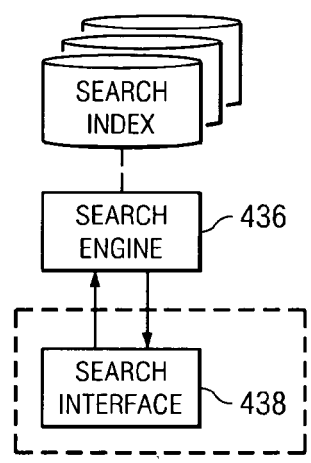

The search interface provides a standard interface for integration with search engines, such as search engine 436 shown in detail in FIG. 4C. The search interface is used when a search capability is required. The mechanism of the present invention does not implement a search capability itself, but rather allows for the concurrent use of any number of search engines. In FIG. 4C, search engine 436 returns results matching the search criteria specified. During information retrieval, if the information searched for does not exist, or if insufficient information exists based on relevancy association rules, the search capability provided through search interface 438 provides a secondary/backup level of information retrieval. For instance, when information is returned through search capability (i.e., relevancy to context/scenario currently unknown), relevancy will be established based on autonomic relevancy building rules. In addition, information access may involve a combination of both relevancy and search criteria. For example, a search may be performed on relevant results to provide another level of refinement. When information objects are added to context-scenario information and relevancy system 400 in FIG. 4A through the information aggregation interface (e.g., aggregation interface 432 in FIG. 4B), this new content is indexed by search engine 436.

Figure 4D:
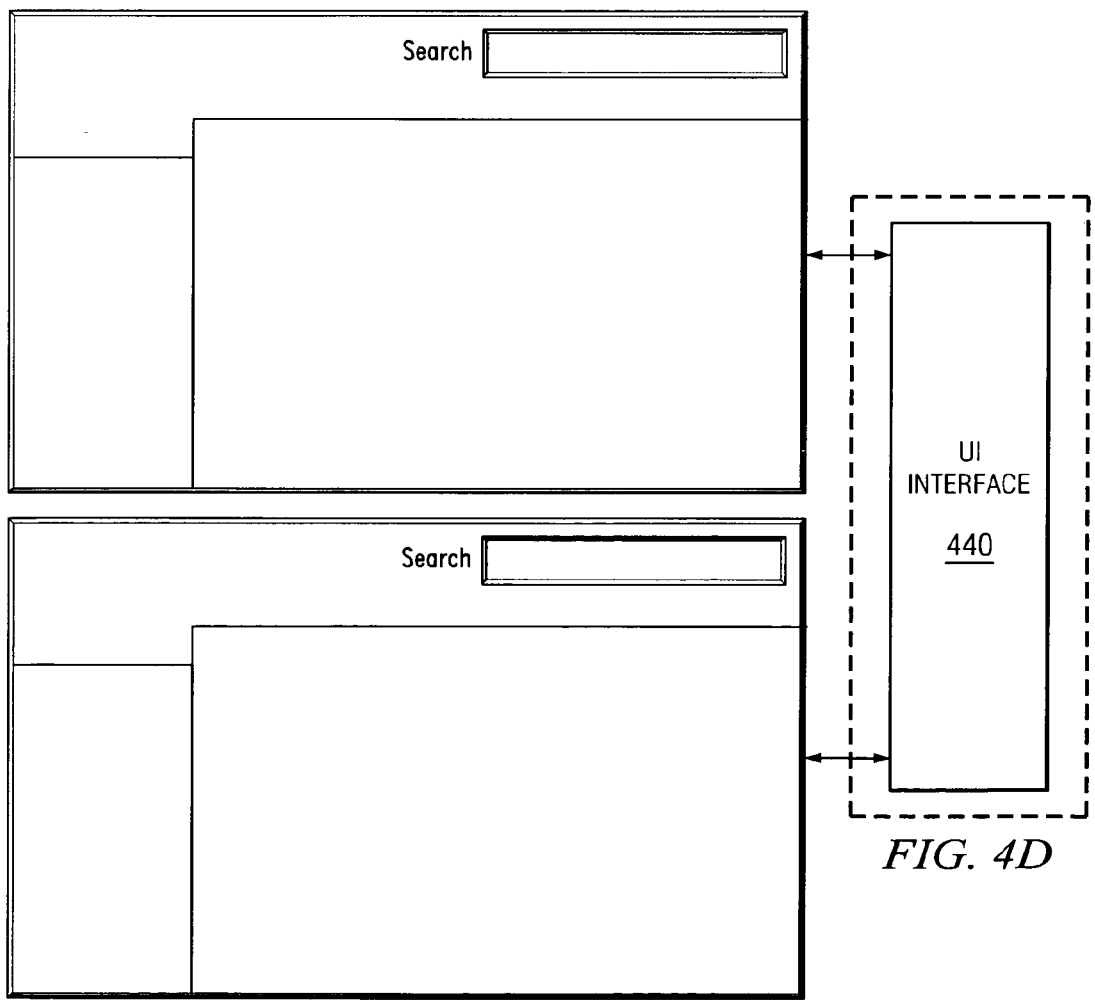

As shown in detail in FIG. 4D, the user interaction interface 440 exposes a standard interface for integration with desired user interaction (i.e., exposes services necessary for user interaction). The mechanism of the present invention does not provide a user interface, but rather provides a user interaction interface which facilitates the "system" to "user" interaction between the front-end and context-scenario information and relevancy system 400 in FIG. 4A. The user interface look and feel, interaction methods, feature usage, and presentation style may be set according to existing business processes and organization. As the embodiments of the present invention are capable of being plugged in to information space where context-scenario organization is desired, the user interaction interface allows for seamless integration into existing user interaction systems and information spaces. In this manner, impact on current business processes and organization is minimized.

Figure 4E:
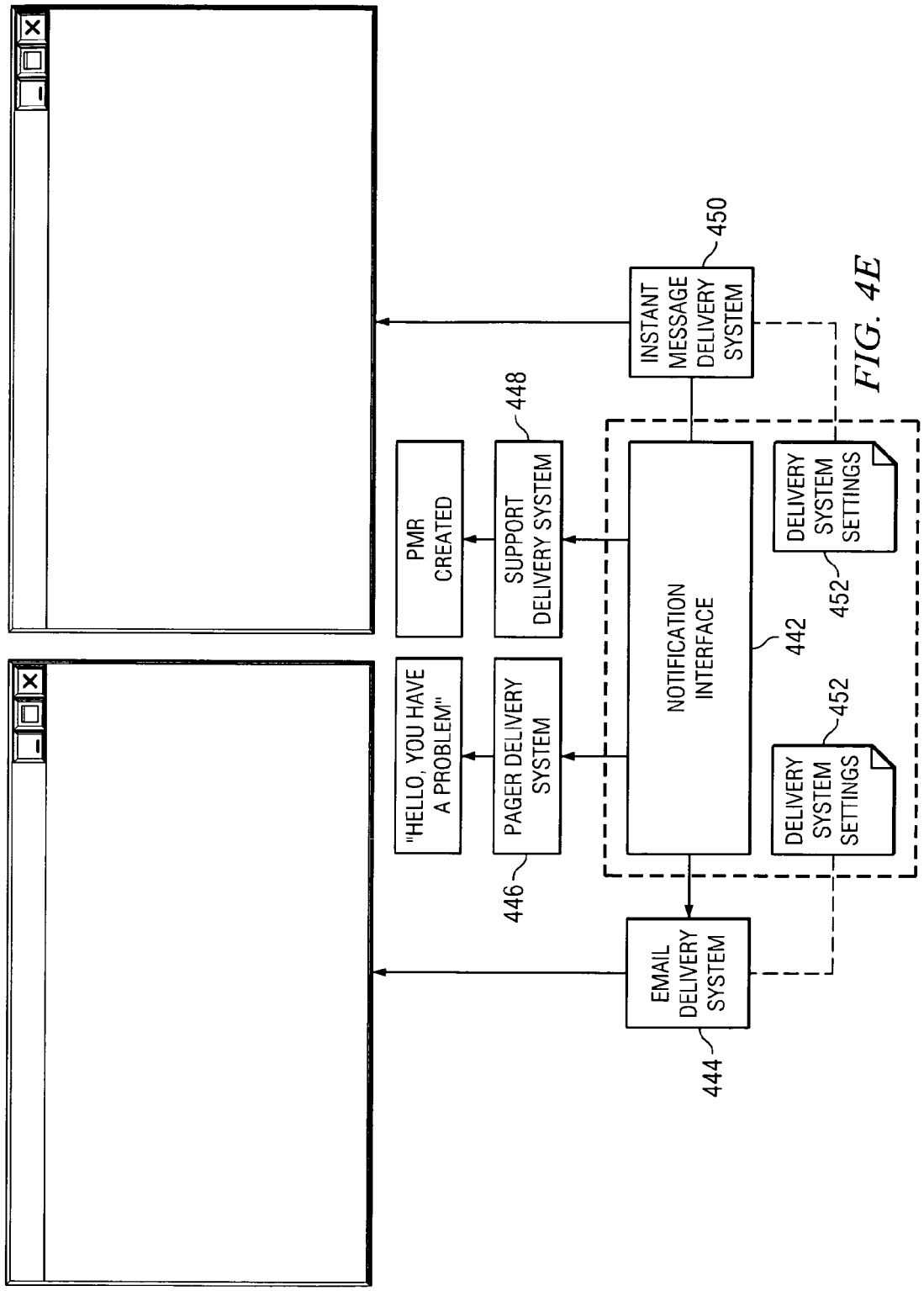

In FIG. 4E, notification interface 442 defines a standard interface for integration with various information delivery systems, such as, for example, electronic mail (e-mail). The mechanism of the present invention does not implement a notification delivery mechanism itself, but instead provides notification triggering capabilities. With notification interface 442, multiple delivery systems may be integrated, with each system corresponding to a distinct delivery method. These notification methods may include, but are not limited to, email 444, pager 446, support 448, and instant messaging 450 delivery systems. Notifications may be passed from the notification interface to the delivery system through a connector, such as, for example, a Java interface or a Java Web service. Each delivery system defines settings 452 of the notification, such as, for example, formatting, content, and scheduling options. Thus, each delivery system negotiates the actual delivery of the notification.

In addition to the user interaction interface, the system may provide information to user through notifications in an autonomic manner. Notifications provide another level of user interaction by providing the ability for proactive information delivery. Thus, information may be delivered to users when or before the information is needed.

Notification interface 442 may provide notification functionality through user profiling. A user profiling repository (e.g., user profile repository 414 in FIG. 4A) stores frequently used contexts for a particular user. These user-specific profile contexts may be accomplished through linkage sets to the context-scenario organization model. The user profile linkage sets are similar to the relevancy linkages, with the exception that linkages for profile context do not include scenario or categorical links and do not have weights. For example, one user profile context may be represented by a single link to a pSeries server node in the organization model. A single user may maintain multiple contexts within a profile, wherein each context is assigned a unique name by the user. Through the user of profile contexts, users may quickly obtain relevant product support information without providing context details. Scenario details may still be applied to the profile context to further refine the retrieval of product support information.

A user may receive notifications based on information subscription settings in the user's profile context via notification interface 442. Information subscriptions allow a user to define criteria regarding how and what information will be sent to the user for proactive delivery of information through notifications. Subscription criteria may include context, desired relevancy, and notification settings, such as delivery methods and scheduling options. For example, when new or updated product/solution information meets user subscription criteria, a notification will be issued to the user according to the delivery methods and scheduling options defined by the user. User profiling also allows a user to create a personal organization model in an information library (e.g., information library 412 in FIG. 4A) and add information objects to that model.

Information library 412 in FIG. 4A comprises product support information obtained from the various aggregation sources via the information aggregation interface. Product support information obtained via the information aggregation interface is stored in information library 412 as information objects. When an information object is initially stored in information library 412, relevancy rules and properties for the information object are defined based on the settings of the data repository from which the information was obtained; These data repository settings, such as file type, object expiration, role, security, etc., may be used to establish initial relevancy and metadata for the information object.

Relevancy module 410 comprises relevancy criteria for information objects in information library 412. Each information object is assigned relevancy weights which are used by a relevancy engine in relevancy module 410 to determine whether an information object is relevant to a particular information retrieval request based on the context-scenario organization model. The relevancy weight of an object is compared against a threshold value. If the object's weight equals or exceeds the threshold value, the object is deemed relevant and is added to a possible result set to be sent to the client.

Figure 5:
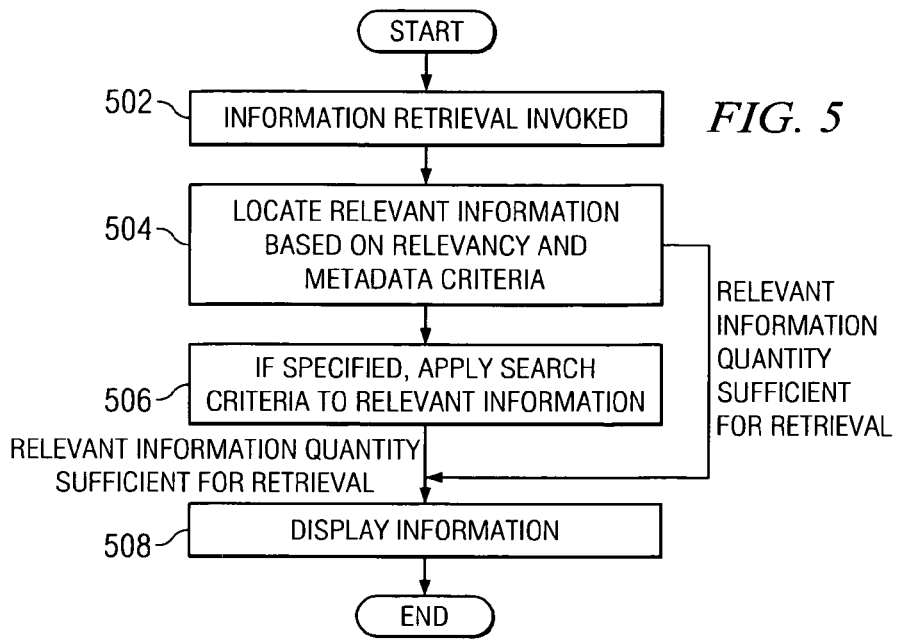
FIG. 5 is an exemplary process illustrating information retrieval activity in accordance with illustrative embodiments of the present invention.

For example, FIG. 5 is an exemplary process illustrating information retrieval activity in accordance with a preferred embodiment of the present invention. The process illustrated in FIG. 5 may be implemented in response to a user information request, and may also be implemented using relevancy module 410 in FIG. 4A. Information retrieval in the present invention employs various criteria, including relevancy criteria, search criteria, metadata criteria, and optional criteria. Relevancy criteria may be used to define the desired information relevant to a particular client's needs. Search criteria may be used to define the search text and search text options. Metadata criteria may be used to define retrieval settings, such as, for example, author, user role, URL, product identifier, model, and/or entitlement. Optional criteria may be used to define other retrieval settings, such as, for example, desired language, file type, how recent the information is, maximum result size, and user access level.

When the information retrieval is invoked (step 502), the mechanism of the present invention locates relevant information based on relevancy and metadata criteria (step 504). Information objects with relevancy weight greater than or equal to a relevancy threshold (part of the relevancy criteria) will be added to possible relevancy results. The relevant information is displayed to the client (step 508).

If search criteria are specified, a search is performed on relevant information by applying the search criteria to relevant information objects (step 506). Information objects with relevancy weight greater than or equal to a relevancy threshold (part of the relevancy criteria) will be added to possible relevancy results. Objects not meeting the search criteria will be ranked lower or removed from the result list. The relevant information is displayed to the client (step 508).

Turning now to FIG. 6, an exemplary diagram of a relevancy association architecture in accordance with a preferred embodiment of the present invention. Relevancy association architecture 600 may be implemented in relevancy module 410 in FIG. 4A. Relevancy association architecture 600 provides linkage sets based on context-scenario driven information organization.

In the relevancy association architecture of the present invention, relevancy is applied through mappings or associations to the context-scenario organization model. Products available from the business enterprise are linked to one another in an ontology. As shown, these relevancy associations may be represented through a tree structure. Each different product of the business enterprise may be viewed as a node or leaf in an ontology. For example, a branch in an ontology may include a particular software operating system node, such as AIX 602. That branch may also terminate with a particular distribution node, such as version 5.0 604, version 5.1 606, or version 5.2 608. Likewise, another branch may include a hardware product, and another branch may include a software product such as Lotus Notes. By connecting each node or leaf in the ontology using a relationship, the hardware product, AIX distribution, and Lotus Notes software are linked together.

When products of the business are linked, relevancy associations may be created through linkage sets from information objects in an information library. Linkage sets are assigned weights to designate the certainty of the relevancy association. For example, positive linkage weights may range from 0 to 100, while negative linkage weights may range from 0 to −100. Use of both positive and negative weight provides the ability to identify relevant and irrelevant objects. As information that is relevant to one user (e.g., a system administrator) may not be as relevant to another user (e.g., a programmer), the linkage set weight may also vary depending on the user type that created the relevancy.

Each information object may have one or more relevancy associations. For instance as shown, AIX 5.2.2 Installation FAQ object 610 has positive weighted linkages to AIX version 5.2 node 608, AIX installation node 614, and support node 612, which add up to a positive relevancy weight of +80 616. Likewise, the pSeries Installation Guide object 618 has positive weighted linkages to pSeries Model 6C3 node 620, support node 612, AIX node 602, and AIX installation node 614, which add up to a positive relevancy weight of +60 622. In contrast, pSeries Installation Guide object 618 has a negative weighted linkage to Linux node 624, which results in a negative relevancy weight of −20 626. Variable data may also be included as information objects, such as error code information.

The following three context scenarios illustrate examples of how the relevancy association architecture of the present invention may be used to provide relevant product support information to clients. In the first example, the context is a client on a pSeries 615 server with AIX v5.1 installed on the server, and the scenario is the client wants to migrate AIX v5.1 to AIX v5.2. As the client's goal is to migrate AIX v5.1 to AIX 5.2, the client requests AIX migration installation instructions. The on-demand solution provided to the client retrieves Migration Installation Instructions (How-To), as well as the AIX Installation Guide and Reference.

In a second example, the context is a client purchased pSeries 615 server without the CD-ROM option and without AIX installed, and the scenario is the client received the server and needs to install AIX using the media (CDs) provided. As the client's goal is to install AIX onto the p615 system without a CD-ROM, the client requests AIX installation instructions. The on-demand solution provided to the client retrieves Network Installation Instructions (How-To), as well as the AIX Installation Guide and Reference.

In a third example, the context is a client on a pSeries server with AIX v5.2.0.0 installed, and the scenario is the client received a media update for AIX v5.2.2.0. However, after upgrading and restarting, the system hangs during the boot process and LED error code 554 is displayed. The client's goal is to successfully upgrade to AIX v5.2.2.0 and restart the system, and the client requests troubleshooting information for upgrading to AIX v5.2.2.0. The on-demand solution provided to the client retrieves the AIX Installation Guide and Reference, AIX v5.2.2.0 installation FAQ, and information from the pSeries Message Center regarding LED error code 554.

Figure 7:
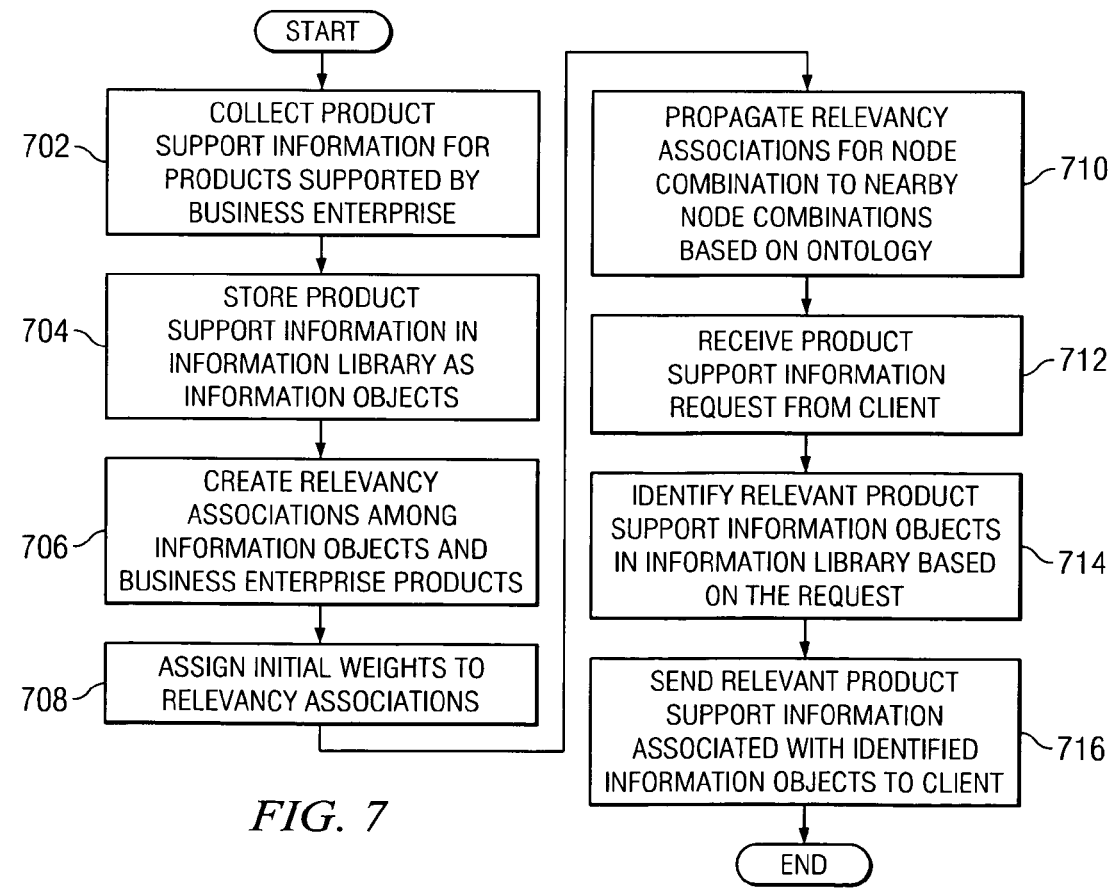
FIG. 7 is a flowchart of a process for associating and organizing available product support information in accordance with illustrative embodiments of the present invention.

FIG. 7 is a flowchart of a process for associating and organizing available product support information in accordance with a preferred embodiment of the present invention. With the relevancy association architecture of the present invention, product support information may be organized and maintained to allow businesses to provide a personalized product support experience for clients. The process illustrated in FIG. 7 may be implemented in a data processing system, such as, for example, server 200 in FIG. 2.

The process begins with collecting product support information for products provided by the business enterprise (step 702). This product support information may be collected from sources internal and external to the business enterprise. The product support information is then stored in an information library as information objects (step 704). Once the information objects have been stored, relevancy associations may be created among the information objects stored in the information library and the products provided by the business enterprise (step 706). The relevancy associations may be created based on an ontology, such as a context-scenario information organization model. A context in the context-scenario information organization model identifies circumstances in which the product support information is needed, and wherein scenario in the context-scenario information organization model identifies events occurring within the context that cause a need for the product support information.

Once the associations have been created, relevancy weights may then be assigned to each relevancy association (step 708). These relevancy weights are used to designate a certainty of each relevancy association. For example, a positive weight is assigned to a relevancy association to identify relevant information objects, and a negative weight is assigned to a relevancy association to identify irrelevant information objects. Relevancy association weights may also be based on the user type that created the relevancy associations. In addition, the relevancy associations for a node combination may be propagated to a nearby node combination based on the context-scenario organization model (step 710).

Next, when a product support information request is received from a client (step 712), the mechanism of the present invention uses the relevancy associations to identify relevant product support information objects in the information library for the request (step 714). For example, an information object may be deemed relevant if the information object has a relevancy weight greater than or equal to a relevancy threshold in the relevancy criteria. The mechanism of the present invention may then send relevant product support information associated with the identified information objects to the client (step 716). This relevant product support information sent to the client may include product support information at a business solution level.

Figure 8:
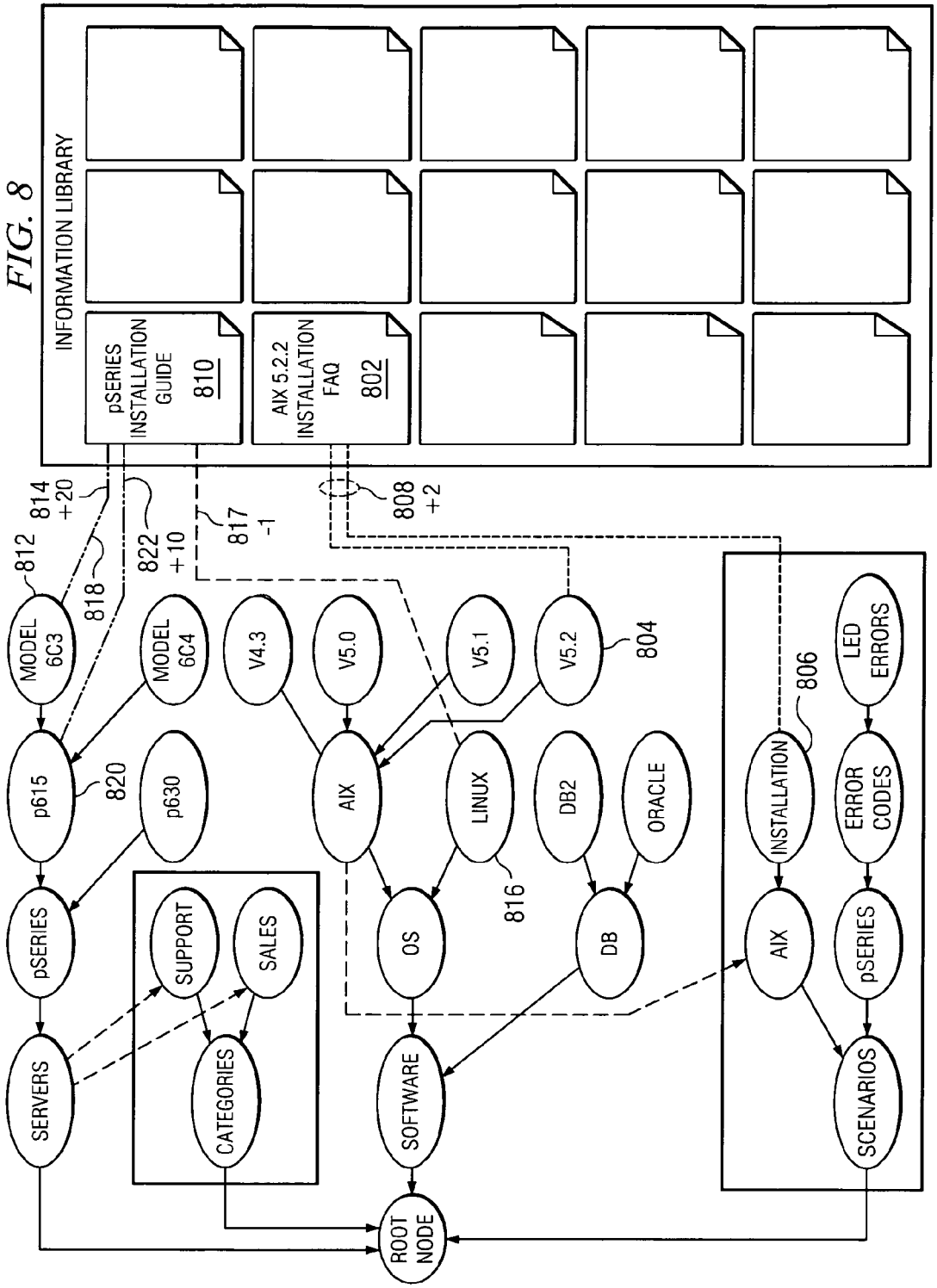
FIG. 8 is an exemplary diagram of autonomic relevancy building in accordance with illustrative embodiments of the present invention using the relevancy architecture shown in FIG. 6.

Turning next to FIG. 8, an exemplary diagram of autonomic relevancy building in accordance with a preferred embodiment of the present invention. In this illustrative example, autonomic relevancy building is implemented using the context-scenario organization model in relevancy association architecture 600 in FIG. 6.

Autonomic relevancy building is a process through which relevancy of information objects are identified and the accuracy improved based on user input, such as system usage and feedback. System usage may be based on information object impressions and usage (or lack of usage). For example, if a user enters search criteria and receives a list of results, the objects the user selects to view will have a greater relevance than the other unselected pages based on the user's usage. Likewise, the longer the user spends viewing a page, the more relevant the link becomes based on the usage.

However, system usage may also be unreliable. For example, although a user selects a link from the result set, the user may have erroneously selected the link or the link may not contain the information desired by the user. Also, system usage may be unreliable if a time-based relevancy collection is used. For example, if the user selects a link and then steps away from the computer for a period of time, the link may be assigned a high relevancy as it appears that the user is spending a great deal of time on the link. Consequently, the link may be registered as having a greater relevancy than actually intended. Thus, as system usage can be unreliable, the relevancy associations created based on the system usage may be weighted less than those relevancy associations created based on user interaction in the form of feedback.

Relevancy associations based on feedback are created based on positive, negative, and neutral responses from users. For example, when a user selects a link and later exits a Web page, a feedback request, such as within a popup window, for instance, is presented to the user. The feedback requests or asks the user whether the information in the link was helpful to the user. Since the feedback approach obtains direct input from users as to the relevancy of the information presented, information from feedback is more reliable. As a result, relevancy associations created from user feedback may be weighted more than those from system usage. Thus, information obtained from user feedback will supercede the information obtained from system usage.

Autonomic relevancy building allows for self-improving and self-maintaining context-scenario organization. Relevancy weights for linkage sets may be updated. A predefined weight may be set for relevancy associations based on system usage. For example, if a predefined weight based on system usage is set to be +5, each time a user clicks a link for a result, a weight of +5 is appended to that information object. A predefined weight may also be assigned to the user feedback mechanism, which requests users to provide feedback on the result. The feedback request may be provided to the user in any form, such as, for example, a question in the form of "Rate this information: _Good _Bad" that appears at the bottom of the page, or as a pop-up question in a separate window. If a predefined weight of 20 is assigned to the user feedback mechanism, when the user selects "Good" as the answer for the user's feedback, then a weight of +20 may now replace the previous weight of +5 based on system usage. If the user selected "Bad" as the user's feedback, then a weight of −20 may replace the previous weight of +5.

As previously mentioned, each information object may have one or more relevancy associations. For instance, AIX 5.2.2 Installation FAQ object 802 has positive relevancy associations based on system usage to AIX version 5.2 node 804 and AIX installation node 806 (+2 relevancy 808). Likewise, pSeries Installation Guide object 810 has a positive relevancy association based on user feedback to pSeries Model 6C3 node 812, (+20 relevancy 814). In contrast, pSeries Installation Guide object 810 has a negative relevancy association based on lack of system usage to Linux node 816 (−1 relevancy 817).

In addition, relevancy associations may be propagated to nearby nodes in the context-scenario organization model. For example, if information is relevant to a particular node combination, it is most likely also relevant (although to a lesser extent) to similar node combinations. For instance, a pSeries Model 6C3 relevancy association may be propagated to the pSeries parent link and its siblings. As shown in FIG. 8, relevancy association 818 between pSeries Model 6C3 812 and pSeries Installation Guide object 810 is propagated to parent pSeries p615 820. The weight of relevancy created between pSeries p615 820 and pSeries Installation Guide object 810 (+10 relevancy 822) is lower than the relevancy between pSeries Model 6C3 812 and pSeries Installation Guide object 810. As mentioned above, the value for positive and negative weight may be predefined. In this example, propagation stops at pSeries p615 820 because the relevancy weight cannot be further reduced to a positive value.

FIG. 9 is a flowchart of a process for autonomic relevancy building in a context-scenario organization model in accordance with a preferred embodiment of the present invention. Through autonomic relevancy building, the relevancy of information objects are identified and improved based on user input. The process illustrated in FIG. 9 may be implemented in a data processing system, such as, for example, server 200 in FIG. 2.

The process begins when a request for product support information is received from a client (step 902). Responsive to the request, the mechanism of the present invention identifies product support information objects in an information library that represent the requested product support information (step 904). Product support information corresponding to the identified product support information objects is then provided to the client (step 906).

The mechanism of the present invention then obtains relevancy data from the client (step 908). This data regarding whether or not the information provided to the client is relevant may be obtained from the client through various methods, such as, for example, implicit feedback (e.g., system usage), explicit feedback (e.g., user feedback), metadata information, or any combination thereof. Once relevancy data has been obtained from the client, the mechanism of the present invention may create or update relevancy associations between the product support information objects in the information library based on the relevancy data (step 910). For example, relevancy associations created from implicit feedback may be based on information object impressions and usage. Relevancy associations created from explicit feedback may be based on client user comments regarding whether the provided product support information was helpful. These comments may comprise positive, negative, or neutral responses from the client users. Each product support information object may have one or more relevancy associations. In addition, relevancy associations may be propagated to nearby nodes in the context-scenario organization model, since information relevant to a particular node combination is most likely also relevant to similar node combinations (step 912).

Relevancy weights may also be assigned or updated for each relevancy association based on the relevancy data, wherein the relevancy weights designate the certainty of each relevancy association (step 914), with the process terminating thereafter. Relevancy weights are used to determine whether an information object is relevant to a particular information retrieval request. If information objects exist with a relevancy weight greater than or equal to a relevancy threshold (part of the relevancy criteria), these information objects will be added to possible relevancy results. Objects not meeting the search criteria will be ranked lower or removed from the result list. Relevancy associations based on explicit feedback may be weighted more than associations based on implicit feedback.

Thus, the present invention provides a method, system, and computer program code for organizing and maintaining product support information to allow businesses to provide a personalized product support experience for clients. The present invention provides an advantage over current product support systems by organizing and linking information regarding solutions offered by a business enterprise using a context-scenario driven organization model, and then providing this relevant information to clients. This information may be provided to support particular products, as well as to support client solutions proposed by the business. A business may also improve customer support by using client access and feedback to determine if information currently provided to clients is helpful or if it needs to be revised. In this manner, the mechanism of the present invention may be used to enhance the product support services provided by businesses to their customers.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for autonomic relevancy building, the computer implemented method comprising:

receiving a request for product support information from a client;

responsive to receiving the request, identifying product support information objects representing the requested product support information in an information library using the received request;

responsive to identifying the product support information objects, providing relevant product support information corresponding to the product support information objects to the client;

obtaining, based on user input received from the client after the client is provided with the relevant product support information, relevancy data from the client regarding the relevant product support information provided to the client, wherein the relevancy data obtained from the client indicates whether or not the relevant product support information provided to the client is relevant to the client;

creating relevancy associations between the product support information objects in the information library based on the relevancy data obtained from the client regarding the relevant product support information provided to the client, wherein a relevancy association is propagated to a nearby node in a context-scenario organization model, wherein the context-scenario organizational model comprises the product support information objects, a hierarchical tree structure of product nodes representing products provided by a business organization, and the relevancy associations which interlink certain of the product support information objects with certain of the product nodes, and wherein the nearby node that the relevancy association is propagated to is a parent node to a particular product node in the hierarchical tree structure of product nodes that the relevancy association directly pertains to.

2. The computer implemented method of claim 1, further comprising:
updating the relevancy associations of the product support information objects based on the relevancy data obtained from the client that indicates whether or not the relevant product support information provided to the client is relevant to the client.

3. The computer implemented method of claim 1, further comprising:
assigning relevancy weights to the relevancy associations based on the user input, wherein the relevancy weights designate a certainty of each relevancy association.

4. The computer implemented method of claim 1, wherein the user input comprises both (1) system usage of a data processing system used by the client in requesting the product support information and (2) real-time user feedback that is received, by the computer implemented process, from the client using the data processing system in direct response to the client being provided with the relevant product support information by the computer implemented process.

5. The computer implemented method of claim 4, wherein system-usage relevancy associations are based on which of the relevant product support information provided to the client is selected by the client.

6. The computer implemented method of claim 4, wherein user-feedback relevancy associations are based on user comments regarding whether the provided product support information was helpful.

7. The computer implemented method of claim 6, wherein user feedback relevancy associations are based on at least one of positive, negative, and neutral responses from clients.

8. The computer implemented method of claim 4, wherein relevancy associations based on user feedback are weighted more than relevancy associations based on system usage.

9. The computer implemented method of claim 4, wherein information obtained from user feedback supersedes information obtained from system usage.

10. The computer implemented method of claim 1, wherein the information library includes a context-scenario organizational model that comprises the product support information objects, a hierarchical tree structure of product nodes representing products provided by a business organization, and the relevancy associations which interlink certain of the product support information objects with certain of the product nodes, wherein each product support information object has a plurality of weighted relevancy associations with other product support information objects in the information library.

11. A data processing system for autonomic relevancy building, the data processing system comprising:
a bus;
a storage device connected to the bus, wherein the storage device contains computer usable code; at least one managed device connected to the bus;
a communications unit connected to the bus; and
a processing unit connected to the bus, wherein the processing unit executes the computer usable code, in response to receiving a request for product support information from a client, to identify product support information objects representing requested product support information in an information library using the received request, provide relevant product support information corresponding to the product support information objects to the client, obtain, based on user input received from the client after the client is provided with the relevant product support information, relevancy data from the client regarding the relevant product support information provided to the client, wherein the relevancy data obtained from the client indicates whether or not the relevant product support information provided to the client is relevant to the client, and create relevancy associations between the product support information objects in the information library based on the relevancy data obtained from the client regarding the relevant product support information provided to the client, wherein a relevancy association is propagated to a nearby node in a context-scenario organization model, wherein the context-scenario organizational model comprises the product support information objects, a hierarchical tree structure of product nodes representing products provided by a business organization, and the relevancy associations which interlink certain of the product support information objects with certain of the product nodes, and wherein the nearby node that the relevancy association is propagated to is a parent node to a particular product node in the hierarchical tree structure of product nodes that the relevancy association directly pertains to.

12. The data processing system of claim 11, wherein the computer usable code further comprises code to update the relevancy associations of the product support information objects based on the relevancy data obtained from the client that indicates whether or not the relevant product support information provided to the client is relevant to the client.

13. The data processing system of claim 11, wherein the computer usable code further comprises code to assign relevancy weights to the relevancy associations based on the user input, wherein the relevancy weights designate a certainty of each relevancy association.

14. A computer program product of computer usable program code stored on a tangible computer readable medium comprising:
computer usable program code for receiving a request for product support information from a client;
computer usable program code for identifying, responsive to the computer usable program code for receiving the request, product support information objects representing the requested product support information in an information library using the received request;
computer usable program code for providing, responsive to the computer usable program code for identifying the product support information objects, relevant product support information corresponding to the product support information objects to the client;
computer usable program code for obtaining, based on user input received from the client after the client is provided with the relevant product support information, relevancy data from the client regarding the relevant product support information provided to the client, wherein the relevancy data obtained from the client indicates whether or not the relevant product support information provided to the client is relevant to the client; and
computer usable program code for creating relevancy associations between the product support information objects in the information library based on the relevancy data obtained from the client regarding the relevant product support information provided to the client, wherein a relevancy association is propagated to a nearby node in a context-scenario organization model, wherein the context-scenario organizational model comprises the product support information objects, a hierarchical tree structure of product nodes representing products provided by a business organization, and the relevancy associations which interlink certain of the product support information objects with certain of the product nodes, and wherein the nearby node that the relevancy association is propagated to is a parent node to a particular product node in the hierarchical tree structure of product nodes that the relevancy association directly pertains to.

15. The computer program product of claim 14, further comprising:

computer usable program code for updating the relevancy associations of the product support information objects based on the relevancy data obtained from the client that indicates whether or not the relevant product support information provided to the client is relevant to the client.

16. The computer program product of claim 14, further comprising:

computer usable program code for assigning relevancy weights to the relevancy associations based on the user input, wherein the relevancy weights designate a certainty of each relevancy association.

17. The computer program product of claim 14, wherein the user input comprises both system usage and real-time user feedback that is received from the client using the computer in direct response to the client being provided with the relevant product support information.

18. The computer program product of claim 17, wherein system-usage relevancy associations are based on which of the relevant product support information provided to the client is selected by the client.

19. The computer program product of claim 17, wherein user-feedback relevancy associations are based on user comments regarding whether the provided product support information was helpful.

20. The computer program product of claim 19, wherein user-feedback relevancy associations are based on at least one of positive, negative, and neutral responses from clients.

* * * * *